United States Patent
Ohno et al.

(10) Patent No.: US 9,726,137 B2
(45) Date of Patent: Aug. 8, 2017

(54) STARTING CONTROL DEVICE FOR INTERNAL COMBUSTION ENGINES AND STARTING CONTROL METHOD

(71) Applicant: NISSAN MOTOR CO., LTD., Yokohama-shi, Kanagawa (JP)

(72) Inventors: Takeshi Ohno, Kanagawa (JP); Kei Watanabe, Kanagawa (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 5 days.

(21) Appl. No.: 14/892,232

(22) PCT Filed: Apr. 11, 2014

(86) PCT No.: PCT/JP2014/060473
§ 371 (c)(1),
(2) Date: Nov. 19, 2015

(87) PCT Pub. No.: WO2014/192439
PCT Pub. Date: Dec. 4, 2014

(65) Prior Publication Data
US 2016/0097365 A1   Apr. 7, 2016

(30) Foreign Application Priority Data

May 30, 2013   (JP) .................................. 2013-113818

(51) Int. Cl.
*F02N 11/08* (2006.01)
*B60K 6/485* (2007.10)
(Continued)

(52) U.S. Cl.
CPC ............ *F02N 11/087* (2013.01); *B60K 6/485* (2013.01); *B60K 6/543* (2013.01); *B60L 11/14* (2013.01);
(Continued)

(58) Field of Classification Search
CPC ...... F02N 11/087; F02N 11/10; F02N 11/101; F02N 11/105; F02N 11/006; F02N 11/04;
(Continued)

(56) References Cited

U.S. PATENT DOCUMENTS 6,555,927 B1   4/2003   Suzuki et al.
2013/0204478 A1   8/2013   Watanabe et al.

FOREIGN PATENT DOCUMENTS

EP   1 052 400 A2   11/2000
EP   1 382 818 A2   1/2004
(Continued)

*Primary Examiner* — Hai Huynh
(74) *Attorney, Agent, or Firm* — Drinker Biddle & Reath LLP

(57) ABSTRACT

A starting control device for an internal combustion engine is provided with a hard cranking device and a soft cranking device that are respectively capable of and incapable of cranking the internal combustion engine to a target idle rotation speed. The starting control device includes: a starting mode determination unit determining whether to carry out starting in a non-combustion pressure mode whereby starting is carried out with the hard cranking device, or in a combustion pressure combination mode whereby starting is carried out through cranking with the soft cranking device while using a combustion pressure generated by supplying fuel to the internal combustion engine in combination; and an intake air amount control unit making an amount of intake air during cranking differ between a case where starting is carried out in the non-combustion pressure mode and a case where starting is carried out in the combustion pressure combination mode.

6 Claims, 4 Drawing Sheets

(51) Int. Cl.
| | |
|---|---|
| B60K 6/543 | (2007.10) |
| B60L 11/14 | (2006.01) |
| B60W 10/06 | (2006.01) |
| B60W 10/08 | (2006.01) |
| B60W 20/00 | (2016.01) |
| F02N 11/04 | (2006.01) |
| F02D 29/02 | (2006.01) |
| F02D 41/06 | (2006.01) |
| F02N 11/00 | (2006.01) |
| F02N 99/00 | (2010.01) |
| B60W 20/40 | (2016.01) |
| F02D 41/00 | (2006.01) |
| F02D 41/24 | (2006.01) |
| F02N 19/00 | (2010.01) |
| F02D 41/08 | (2006.01) |
| F02D 31/00 | (2006.01) |

(52) U.S. Cl.
CPC ............ *B60W 10/06* (2013.01); *B60W 10/08* (2013.01); *B60W 20/00* (2013.01); *B60W 20/40* (2013.01); *F02D 29/02* (2013.01); *F02D 41/0002* (2013.01); *F02D 41/062* (2013.01); *F02D 41/2422* (2013.01); *F02N 11/006* (2013.01); *F02N 11/04* (2013.01); *F02N 99/004* (2013.01); *F02N 99/006* (2013.01); *F02D 31/003* (2013.01); *F02D 41/086* (2013.01); *F02D 2041/001* (2013.01); *F02D 2200/021* (2013.01); *F02N 11/0814* (2013.01); *F02N 2019/002* (2013.01); *Y02T 10/6226* (2013.01); *Y02T 10/6286* (2013.01)

(58) Field of Classification Search
CPC .. F02N 11/0814; F02N 99/006; F02N 99/004; F02D 41/2422; F02D 41/0002; F02D 41/086; F02D 41/062; F02D 29/02; F02D 2041/001; F02D 2200/021; F02D 2019/002; B60W 20/40; B60W 20/00; B60W 10/08; B60W 10/06; B60K 6/485; B60K 6/543; B60L 11/14; Y02T 10/6286; Y02T 10/6226
USPC ... 123/179.3, 179.7, 179.14, 179.15, 179.16, 123/179.17, 179.18, 179.28, 179.25; 290/38 R, 40 R
See application file for complete search history.

(56) References Cited

FOREIGN PATENT DOCUMENTS

| | | |
|---|---|---|
| JP | H10-136508 A | 5/1998 |
| JP | 2001-152901 A | 6/2001 |
| JP | 2001-193612 A | 7/2001 |
| JP | 2008-157095 A | 7/2008 |
| WO | WO 2012/053333 A1 | 4/2012 |

# STARTING CONTROL DEVICE FOR INTERNAL COMBUSTION ENGINES AND STARTING CONTROL METHOD

TECHNICAL FIELD

The present invention relates to an apparatus and a method for controlling starting of an internal combustion engine.

BACKGROUND ART

According to JP 2001-193612A, an internal combustion engine is started using a motor for starting the engine (starter) or a motor generator. One of them is selected for use in starting depending on a vehicle speed so as to prevent a passenger from feeling a sense of discomfort.

SUMMARY OF INVENTION

However, JP 2001-193612A does not discuss the amount of intake air at the time of starting depending on which one of the starter and the motor generator is used for starting. This gives rise to the possibility that the engine revs up or down immediately after starting.

In view of this, the present invention aims to provide a starting control device and a starting control method for an internal combustion engine that can alleviate revving up and revving down of an engine immediately after starting.

According to one embodiment of this invention, a starting control device for an internal combustion engine, the starting control device being provided with a hard cranking device and a soft cranking device, the hard cranking device being capable of cranking the internal combustion engine to a target idle rotation speed, and the soft cranking device producing smaller output than the hard cranking device and being incapable of cranking the internal combustion engine to the target idle rotation speed, is provided. The starting control device for an internal combustion engine comprising: a starting mode determination unit determining whether to carry out starting in a non-combustion pressure mode whereby the internal combustion engine is started by bringing the internal combustion engine to the target idle rotation speed through cranking with the hard cranking device, or in a combustion pressure combination mode whereby the internal combustion engine is started by bringing the internal combustion engine to the target idle rotation speed through cranking with the soft cranking device while using a combustion pressure in combination, the combustion pressure being generated by supplying fuel to the internal combustion engine; and an intake air amount control unit making an amount of intake air during cranking differ between a case where starting is carried out in the non-combustion pressure mode and a case where starting is carried out in the combustion pressure combination mode.

DESCRIPTION OF EMBODIMENTS

Figure 1:
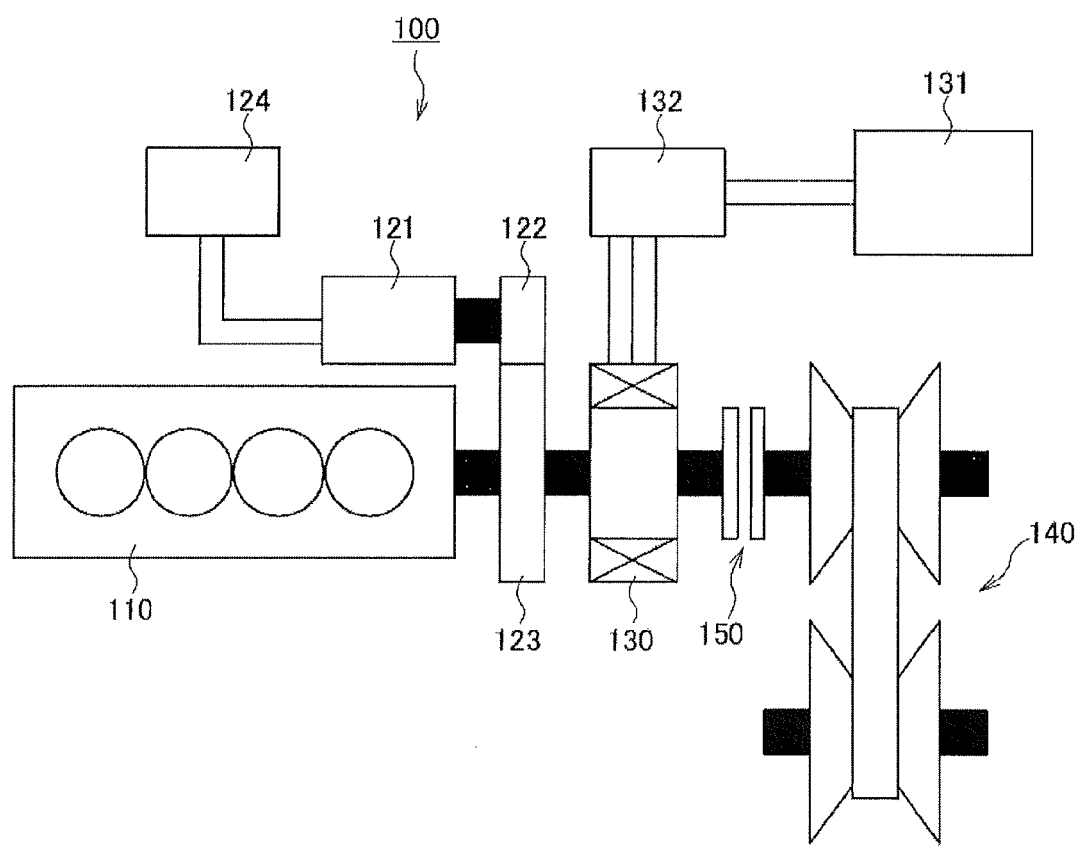
FIG. 1 shows configurations of major components of a system to which a starting control device for an internal combustion engine according to the present invention is applied.

FIG. 1 shows configurations of major components of a system to which a starting control device for an internal combustion engine according to the present invention is applied.

The starting control device for the internal combustion engine according to the present invention is applied to, for example, a hybrid electric vehicle (hereinafter referred to as "HEV" as appropriate). Configurations of major components of an HEV 100 will now be described.

The HEV 100 includes an internal combustion engine 110, a starter mechanism 120, a motor generator 130, and a transmission 140.

The internal combustion engine 110 and the motor generator 130 are driving sources for the HEV 100.

The starter mechanism 120 includes a starter 121, a pinion gear 122, and a ring gear 123. The starter 121 serves as a soft cranking device. The pinion gear 122 is mounted on a rotation shaft of the starter 121. The ring gear 123 is arranged between the internal combustion engine 110 and the motor generator 130, which serves as a hard cranking device. The ring gear 123 meshes with the pinion gear 122. With such a structure, when a starter battery 124 supplies electric power, the starter 121 rotates, and its rotation torque is transmitted to the internal combustion engine 110 via the pinion gear 122 and the ring gear 123. The starter 121 can only output torque corresponding to up to a cranking rotation speed (e.g., 200 rpm), and cannot output torque corresponding to a target idle rotation speed (e.g., 700 rpm). Therefore, in a case where the internal combustion engine 110 is started using the starter 121, a combustion pressure generated through supply of fuel to the internal combustion engine 110 rotated by the starter 121 is used in combination in starting the internal combustion engine 110. It should be noted that such engine starting is a very common method.

The motor generator 130 is, for example, a three-phase alternating-current motor. The motor generator 130 rotates as electric power of a hybrid battery 131 is supplied thereto via an inverter 132 as necessary. Rotation torque of the motor generator 130 enables the HEV 100 to run. In addition, rotation torque of the motor generator 130 enables cranking, that is to say, starting of the internal combustion engine 110. Cranking torque of the motor generator 130 is larger than cranking torque of the starter 121. As opposed to the starter 121 that cannot output torque corresponding to the target idle rotation speed, the motor generator 130 produces large output torque and can output sufficient cranking torque corresponding to the target idle rotation speed of the internal combustion engine 110. In the case of the motor generator 130, a combustion pressure is not particularly required to start the internal combustion engine.

It should be noted that regenerative electric power is generated when the motor generator 130 is driven by rotation upon application of an external force thereto. The hybrid battery 131 is charged by the regenerative electric power via the inverter 132.

As such, the motor generator 130 is a driving source for the HEV 100, serves as an electric generator that generates regenerative electric power, and fulfills the functions of an electromagnetic starting apparatus for starting the internal combustion engine 110.

The transmission 140 shifts the output rotation(s) of the internal combustion engine 110 and/or the motor generator 130. A clutch 150 is arranged between the transmission 140 and the motor generator 130. The clutch 150 is released when starting the internal combustion engine 110. This can prevent needless transmission of cranking torque, for starting the internal combustion engine 110, to the transmission 140.

A description is now given of an overview of the present embodiment to facilitate the understanding of the present embodiment.

As stated earlier, the starting control device for the internal combustion engine according to the present embodiment has a mode for starting the internal combustion engine using the starter 121 (combustion pressure combination mode), and a mode for starting the internal combustion engine using the motor generator 130 (non-combustion pressure mode).

In the combustion pressure combination mode, the internal combustion engine 110 is started by generating a combustion pressure through supply of fuel while rotating the internal combustion engine 110 using the starter 121 that produces small cranking torque.

In the non-combustion pressure mode, the internal combustion engine 110 is started by cranking the internal combustion engine to the target idle rotation speed with the motor generator 130. As cranking torque of the motor generator 130 is large, the motor generator 130 can maintain the target idle rotation speed without using the combustion pressure of the internal combustion engine in combination. Starting with the motor generator 130 requires a shorter period of time than starting with the starter 121. For this reason, it is preferable that starting be carried out with the motor generator 130 whenever possible.

However, there may be a case in which cranking torque of the motor generator 130 is reduced due to a low remaining level or a low temperature of the hybrid battery 131.

In such a case, the internal combustion engine 110 is started in the combustion pressure combination mode, using the starter 121 in combination with the combustion pressure of the internal combustion engine 110, as stated earlier.

Incidentally, conventionally there has been no discussion about how to set the amount of intake air at the time of starting in a case where the internal combustion engine 110 is started using the motor generator 130. If the area of an opening (the amount of intake air) of a throttle, which is a setting for the case of starting with a conventional starter, is applied also to the case of starting with a motor generator, then the engine will rev up or down immediately after starting. This is because an extra amount of air is set in consideration of the inertia associated with combustion-induced boosting of the internal combustion engine to the target idle rotation speed.

In view of this, the concept of the present embodiment is to make the amount of intake air differ between the non-combustion pressure mode and the combustion pressure combination mode.

The specific detail will now be described.

Figure 2:
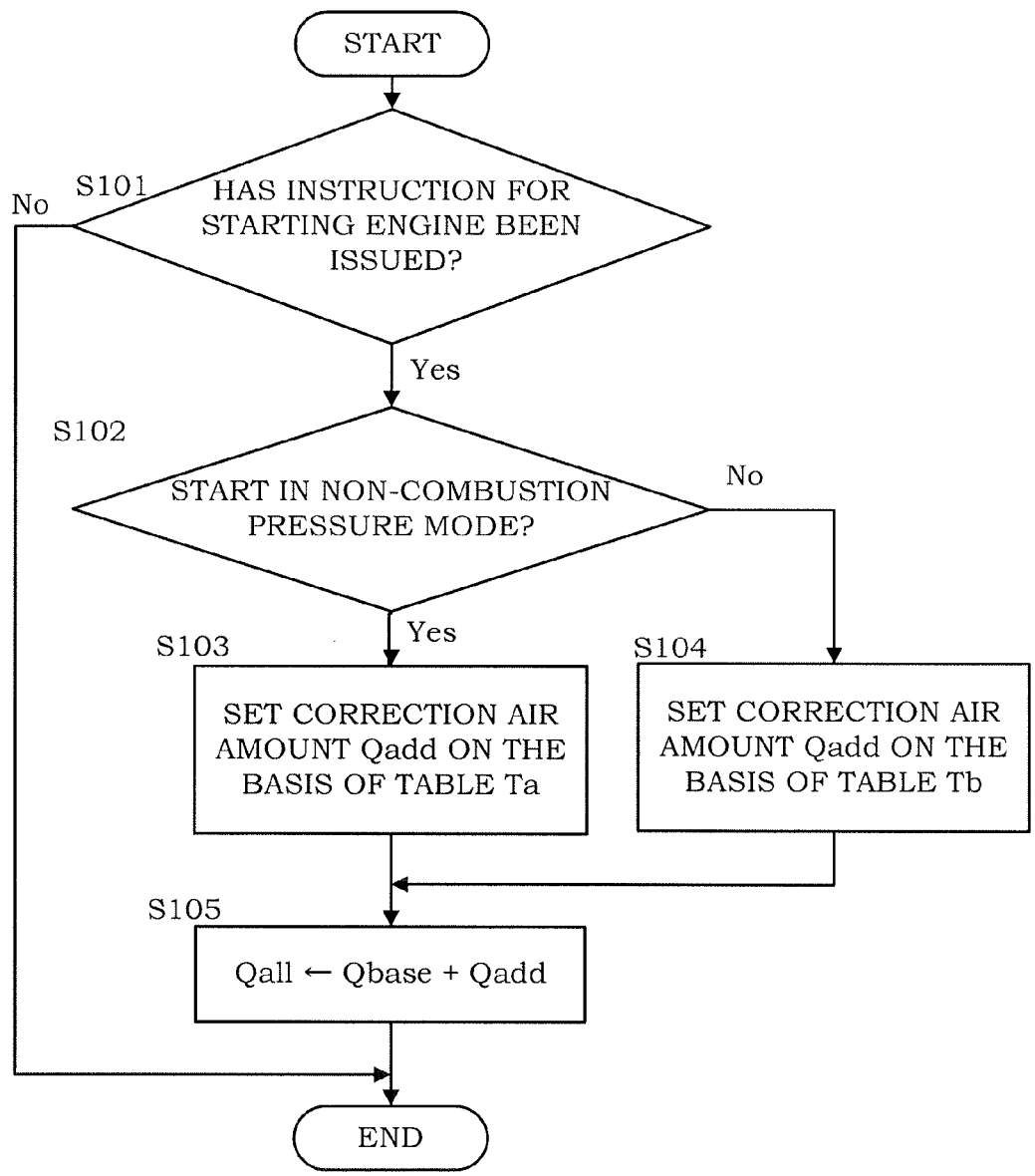
FIG. 2 is a flowchart showing the detail of control performed by a controller of the starting control device for the internal combustion engine.

FIG. 2 is a flowchart showing the detail of control performed by a controller of the starting control device for the internal combustion engine.

It should be noted that this flowchart is repeatedly executed every cycle of a minuscule period of time (e.g., 10 milliseconds).

In step S101, the controller determines whether an instruction for starting the internal combustion engine 110 has been issued. The instruction for starting the engine is issued by a driver's operation. The instruction is also issued when returning from an idling stop. It should be noted that the idling stop includes a case in which the internal combustion engine 110 is stopped while a vehicle is in a stopped state, and a case in which the internal combustion engine 110 is stopped while running in an EV mode. The controller ends the processing until the starting instruction is issued, and proceeds to step S102 upon the issuance of the starting instruction.

In step S102, the controller determines whether to carry out starting in the non-combustion pressure mode. As stated earlier, an instruction for starting the engine is issued by a driver's operation, and is also issued when returning from the idling stop. The idling stop is permitted only when the remaining battery level is sufficient. Therefore, the non-combustion pressure mode is normally selected upon return from the idling stop. If the remaining battery level decreases during the idling stop due to, for example, use of an air conditioner or running in the EV mode, the internal combustion engine 110 is started when the decrease reaches a remaining battery level that allows for starting of the engine in the non-combustion pressure mode. Thus, in this case also, the non-combustion pressure mode is selected.

In a case where the engine is started by a driver's operation, the non-combustion pressure mode is selected if the remaining battery level is sufficient. On the other hand, the combustion pressure combination mode is selected if the remaining battery level is low, or if electric power that can be output is low due to a low battery temperature.

It should be noted that, compared to the combustion pressure combination mode, the non-combustion pressure mode requires a short period of time in starting the engine. For this reason, the non-combustion pressure mode is selected when the internal combustion engine 110 can be started in either mode, whereas the combustion pressure combination mode is selected only when the internal combustion engine 110 cannot be started in the non-combustion pressure mode.

In step S102, the controller proceeds to step S103 if the result of determination is affirmative, and proceeds to step S104 if the result of determination is negative.

In step S103, the controller sets a correction air amount Qadd on the basis of a non-combustion pressure mode table Ta. On the other hand, in step S104, the controller sets the correction air amount Qadd on the basis of a combustion pressure combination mode table Tb. The specific detail thereof will be described later.

In step S105, the controller obtains a total air amount Qall by adding the correction air amount Qadd to an air amount Qbase required to maintain the target idle rotation speed. Then, the controller controls the opening degree of an intake air throttle, the time to open/close a valve (valve timing), and the like so as to enable supply of the total air amount Qall.

Figure 3:
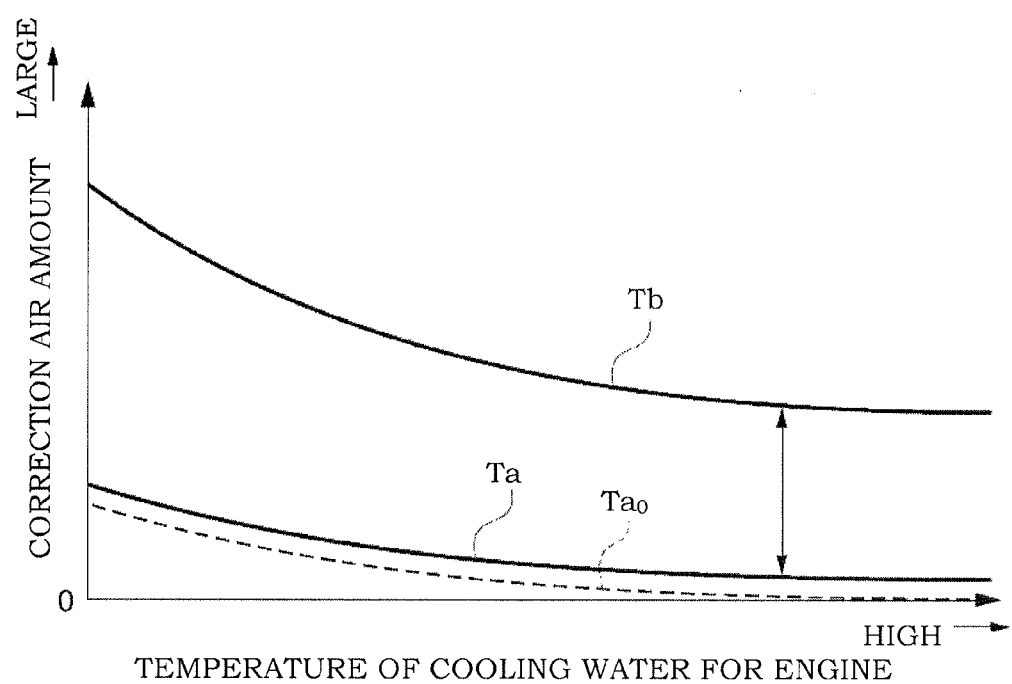
FIG. 3 shows a correlation between the temperature of cooling water for the engine and the correction air amounts in a non-combustion pressure mode and a combustion pressure combination mode.

With reference to FIG. 3, a description is now given of the correction air amounts set in the non-combustion pressure mode (step S103) and the combustion pressure combination mode (step S104). It should be noted that FIG. 3 shows a correlation between the temperature of cooling water for the engine and the correction air amounts in the non-combustion pressure mode and the combustion pressure combination mode.

As apparent from FIG. 3, the higher the temperature of the cooling water, the smaller the correction air amounts. Also, the correction air amount in the non-combustion pressure mode is smaller than the correction air amount in the combustion pressure combination mode.

In the combustion pressure combination mode, the internal combustion engine 110 is started by generating a combustion pressure through supply of fuel while rotating the internal combustion engine 110 with the starter 121. Accordingly, an air amount that is sufficient to boost the rotation speed of the engine against friction torque is set.

On the other hand, in the non-combustion pressure mode, the internal combustion engine 110 can be maintained at the target idle rotation speed only with cranking torque of the motor generator 130 as stated earlier. Therefore, when the temperature of the cooling water for the engine is sufficiently high, it is sufficient to supply only the air amount Qbase required to maintain the target idle rotation speed without adding the correction air amount Qadd. In contrast, when the temperature of the cooling water for the engine is low, fuel does not easily vaporize, and thus a larger correction air amount Qadd is added in relation to a lower temperature of the cooling water for the engine.

It should be noted that an air amount difference ΔQadd between the correction air amount in the non-combustion pressure mode and the correction air amount in the combustion pressure combination mode is the amount of air required to generate a combustion pressure equivalent to torque that the motor generator 130 can output at the target idle rotation speed. That is to say, the amount of air supplied in the non-combustion pressure mode is smaller than the amount of air supplied in the combustion pressure combination mode by the amount of air required to generate the combustion pressure equivalent to the torque that the motor generator 130 can output at the target idle rotation speed.

After the completion of starting, the correction air amount Qadd is reduced to zero.

Figure 4A:
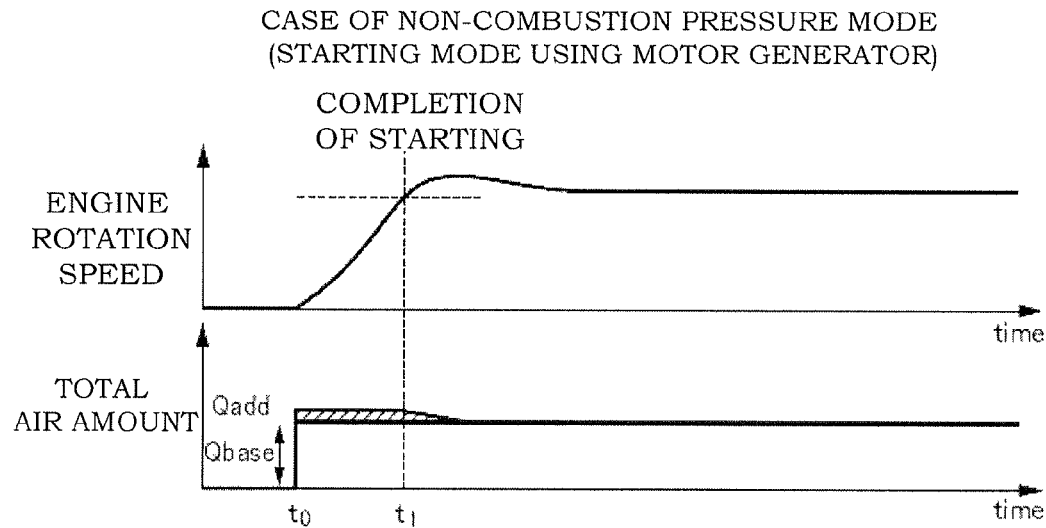
FIG. 4A is a timing chart for a case in which a control logic shown in FIG. 2 is executed and the non-combustion pressure mode is selected.
Figure 4B:
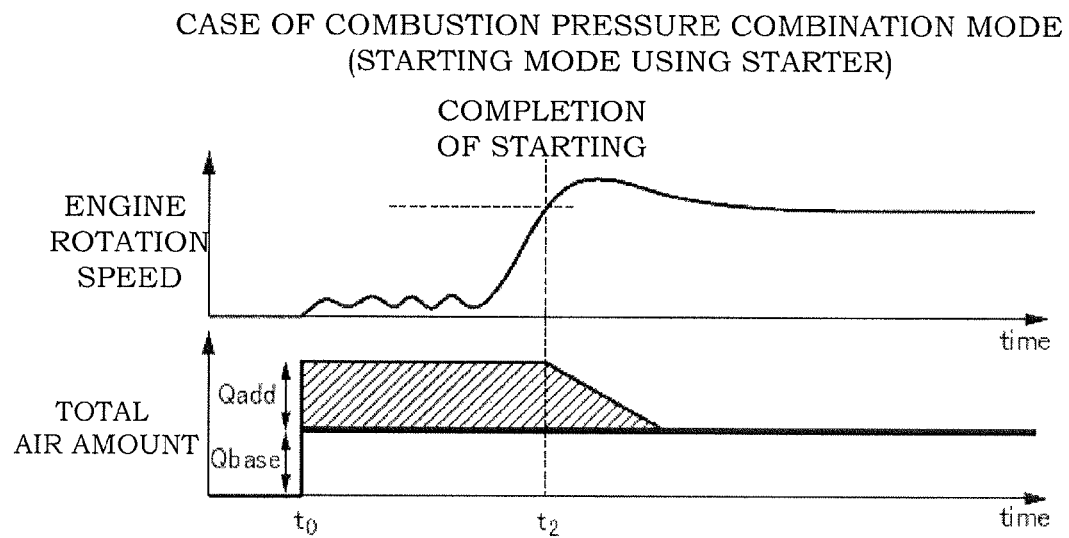
FIG. 4B is a timing chart for a case in which the control logic shown in FIG. 2 is executed and the combustion pressure combination mode is selected.

FIGS. 4A and 4B are time charts for a case in which a control logic shown in FIG. 2 is executed.

It should be noted that the numbers of the steps in the above flowchart will be indicated below to make it easy to understand the correspondence with the above flowchart.

FIG. 4A depicts the case of the non-combustion pressure mode (a starting mode using the motor generator).

At time t0, an instruction for starting the internal combustion engine 110 is issued (step S101), and the non-combustion pressure mode is selected (the yes branch of step S102). In this case, the correction air amount Qadd is set on the basis of the non-combustion pressure mode table Ta (step S103), and the total air amount Qall is set accordingly (S105). Thereafter, the internal combustion engine 110 is started through supply of the total air amount Qall.

After the completion of starting of the internal combustion engine 110 at time t1, the correction air amount Qadd is reduced to zero.

FIG. 4B depicts the case of the combustion pressure combination mode (a starting mode using the starter).

At time t0, an instruction for starting the internal combustion engine 110 is issued (step S101), and the combustion pressure combination mode is selected (the no branch of step S102). In this case, the correction air amount Qadd is set on the basis of the combustion pressure combination mode table Tb (step S104), and the total air amount Qall is set accordingly (S105). Thereafter, the internal combustion engine 110 is started through supply of the total air amount Qall.

After the completion of starting of the internal combustion engine 110 at time t2, the correction air amount Qadd is reduced to zero.

As shown in FIGS. 4A and 4B, in a case where the combustion pressure combination mode is selected, a large correction air amount Qadd is set so as to generate a combustion pressure that yields cranking torque sufficient to start the internal combustion engine 110 when fuel is supplied while rotating the internal combustion engine 110 with the starter 121 that produces small cranking torque. In this way, reliable starting of the internal combustion engine 110 is guaranteed.

On the other hand, in a case where the non-combustion pressure mode is selected, the internal combustion engine 110 is started by boosting the internal combustion engine 110 to the target idle rotation speed only with cranking torque of the motor generator 130. At this time, basically, only the air amount Qbase required to maintain the target idle rotation speed is supplied. When the temperature of the cooling water for the engine is low, the correction air amount Qadd is added as fuel does not easily vaporize. That is to say, only the air amount required to maintain the target idle rotation speed is supplied, although variations exist depending on the temperature of the cooling water for the engine. A smaller correction air amount Qadd is set in the non-combustion pressure mode than in the combustion pressure combination mode. This can prevent a driver from feeling a sense of discomfort attributed to revving up of the internal combustion engine 110. In addition, at the time of subsequent clutch engagement, shock can be alleviated. Furthermore, when the internal combustion engine 110 is started while running in the EV mode, the occurrence of stepwise differences in a driving force can be suppressed. Moreover, as the amount of air at the time of starting does not needlessly increase, the amount of fuel consumption at the time of starting decreases, and a favorable fuel economy performance can be achieved. In a case where the internal combustion engine is a gasoline engine, rev-up could possibly be prevented by, for example, retarding the time of ignition, instead of suppressing rev-up by reducing the amount of air as in the present embodiment. However, this technique lowers fuel economy. By reducing the amount of needless air at the time of starting as in the present embodiment, the amount of fuel consumption at the time of starting decreases, and a favorable fuel economy performance can be achieved.

The above-described embodiment of the present invention merely illustrates a part of example applications of the present invention, and specific configurations of the above-described embodiment are not intended to limit a technical scope of the present invention.

For example, the tables shown in FIG. 3 are merely examples. The non-combustion pressure mode table Ta indicated by a solid line in FIG. 3 may be replaced with a non-combustion pressure mode table Ta0 indicated by a dash line in FIG. 3. The non-combustion pressure mode table Ta0 exhibits convergence on zero when the temperature of the cooling water for the engine is higher than a predetermined temperature. The specific details of the tables may be set as appropriate.

Furthermore, although the starting control device for the internal combustion engine is applied to an HEV in the above description, the starting control device need not necessarily be applied to an HEV.

The starting control device may be applied to a vehicle that is driven only with the internal combustion engine as long as the starting control device is provided with a hard cranking device that is capable of cranking the internal combustion engine to the target idle rotation speed, and a soft cranking device that produces smaller output than the hard cranking device and is incapable of cranking the internal combustion engine to the target idle rotation speed.

This application claims priority based on Japanese Patent Application No. 2013-113818 filed with the Japan Patent Office on May 30, 2013, the entire contents of which are incorporated into this application by reference.

The invention claimed is:

1. A starting control device for an internal combustion engine, the starting control device being provided with a hard cranking device and a soft cranking device, the hard cranking device being capable of cranking the internal combustion engine to a target idle rotation speed, and the soft cranking device producing smaller output than the hard cranking device and being incapable of cranking the internal combustion engine to the target idle rotation speed, the starting control device comprising:
 a programmable controller programmed to:
 determine whether to carry out starting in a non-combustion pressure mode whereby the internal combustion engine is started by bringing the internal combustion engine to the target idle rotation speed through cranking with the hard cranking device, or in a combustion pressure combination mode whereby the internal combustion engine is started by bringing the internal combustion engine to the target idle rotation speed through cranking with the soft cranking device while using a combustion pressure in combination, the combustion pressure being generated by supplying fuel to the internal combustion engine; and
 make an amount of intake air during cranking differ between a case where starting is carried out in the non-combustion pressure mode and a case where starting is carried out in the combustion pressure combination mode.

2. The starting control device for the internal combustion engine according to claim 1, wherein
 the controller is further programmed to reduce the amount of intake air during cranking in the case where starting is carried out in the non-combustion pressure mode compared to the case where starting is carried out in the combustion pressure combination mode.

3. The starting control device for the internal combustion engine according to claim 1, wherein
 the controller is further programmed to make the amount of intake air during cranking in the non-combustion pressure mode smaller than the amount of intake air during cranking in the combustion pressure combination mode by an amount of air required to generate a combustion pressure equivalent to torque that the hard cranking device can output at the target idle rotation speed.

4. The starting control device for the internal combustion engine according to claim 1, wherein
 the controller is further programmed to set the amount of intake air during cranking only to an amount required to maintain the target idle rotation speed in the case where starting is carried out in the non-combustion pressure mode.

5. The starting control device for the internal combustion engine according to claim 1, wherein
 the hard cranking device is an electric motor used also for running of a vehicle, and
 the soft cranking device is an electric motor not used for running of the vehicle.

6. A starting control method for an internal combustion engine, the starting control method being provided with a hard cranking device and a soft cranking device, the hard cranking device being capable of cranking the internal combustion engine to a target idle rotation speed, and the soft cranking device producing smaller output than the hard cranking device and being incapable of cranking the internal combustion engine to the target idle rotation speed, the starting control method comprising:
 a starting mode determination procedure configured to determine whether to carry out starting in a non-combustion pressure mode whereby the internal combustion engine is started by bringing the internal combustion engine to the target idle rotation speed through cranking with the hard cranking device, or in a combustion pressure combination mode whereby the internal combustion engine is started by bringing the internal combustion engine to the target idle rotation speed through cranking with the soft cranking device while using a combustion pressure in combination, the combustion pressure being generated by supplying fuel to the internal combustion engine; and
 an intake air amount control procedure configured to make an amount of intake air during cranking differ between a case where starting is carried out in the non-combustion pressure mode and a case where starting is carried out in the combustion pressure combination mode.

* * * * *